(12) United States Patent
Misson

(10) Patent No.: US 9,074,723 B2
(45) Date of Patent: Jul. 7, 2015

(54) HOOKING AND RELEASING DEVICE FOR BLOCKS

(71) Applicant: Angelo Misson, Monfalcone (IT)

(72) Inventor: Angelo Misson, Monfalcone (IT)

(73) Assignee: NAVALIMPIANTI S.P.A. (IT)

( * ) Notice: Subject to any disclaimer, the term of this patent is extended or adjusted under 35 U.S.C. 154(b) by 265 days.

(21) Appl. No.: 13/862,054

(22) Filed: Apr. 12, 2013

(65) Prior Publication Data
US 2013/0233994 A1 Sep. 12, 2013

Related U.S. Application Data

(63) Continuation of application No. PCT/EP2011/002374, filed on May 13, 2011.

(30) Foreign Application Priority Data

Oct. 12, 2010 (IT) .............................. UD2010A0185

(51) Int. Cl.
| | |
|---|---|
| *B66C 1/34* | (2006.01) |
| *F16M 13/02* | (2006.01) |
| *B63B 23/48* | (2006.01) |
| *B66D 3/04* | (2006.01) |

(52) U.S. Cl.
CPC ................ *F16M 13/02* (2013.01); *B63B 23/48* (2013.01); *B66D 3/043* (2013.01)

(58) Field of Classification Search
CPC ............ F16M 13/02; B66C 1/12; B66C 1/34; B66C 1/62; B66C 1/54; B66C 1/36; B66C 13/26; B66C 13/06; B66C 19/002; B66C 13/00; E21F 13/065; B63B 23/48; B66D 3/043; B66D 1/26; B66D 1/06
USPC ........................................................ 294/82.31
See application file for complete search history.

(56) References Cited

U.S. PATENT DOCUMENTS

| | | | |
|---|---|---|---|
| 2,949,617 A | | 8/1960 | Taylor |
| 2,994,513 A | * | 8/1961 | Bowerman et al. ........... 254/337 |
| 3,936,034 A | * | 2/1976 | Larralde ....................... 254/399 |

(Continued)

FOREIGN PATENT DOCUMENTS

| | | |
|---|---|---|
| GB | 989871 A | 4/1965 |
| WO | 8809741 A1 | 12/1988 |

OTHER PUBLICATIONS

International Preliminary Report on Patentability Application No. PCT/EP2011/002374 Completed: Sep. 6, 2012 6 pages.

(Continued)

*Primary Examiner* — Stephen Vu
(74) *Attorney, Agent, or Firm* — St. Onge Steward Johnston & Reens LLC

(57) ABSTRACT

Automatic hooking device with controlled releasing operation is mounted to a ship or other transportation device with a hooking member having an engaging member operated by ascending movement of a block and fixed to a support structure on lifting blocks, the hooking device is a system of moveable levers reciprocally interconnected by pins, the levers move the hooking device between two end positions to engage or release with the block depending on if the hooking device is in the engaging or releasing position, where a control device operates the hooking device and levers to move the hooking device between the engaging or releasing position to secure or release the block.

22 Claims, 8 Drawing Sheets

(56) References Cited

U.S. PATENT DOCUMENTS 4,360,112 A * 11/1982 Brewer et al. .................. 212/312
4,597,497 A *  7/1986 Aberegg ........................ 212/274
5,603,420 A *  2/1997 Swanson ....................... 212/274

OTHER PUBLICATIONS

International Search Report Application No. PCT/EP2011/002374 Completed: Jul. 28, 2011; Mailing Date: Aug. 4, 2011 2 pages.

* cited by examiner

HOOKING AND RELEASING DEVICE FOR BLOCKS

FIELD OF THE INVENTION

The present invention is relative to an automatic hooking device with controlled releasing operation for lifting blocks for ships/boats/vessels or equivalent means for transportation of both goods and passengers according to the precharacterizing part of main claim.

The invention extends also to cranes for life boats which are installed on the ships, particularly with reference to, but not limited to the stationary installations, that is without slidable or hinged arms or of the composite type.

BACKGROUND OF THE INVENTION

The operating principle of the cranes with movable arms, namely which are suitable to accomplish linear or rotational movements or of the composite type is known. In case of the stationary installations, the lifting and the furling operations of the hoist block occurs without any movement of the structure which houses the hanging pulleys of the hoist block, therefore it is not possible to use the movement of the arm in order to retaining in a safe condition the block, both during the movements of the load and, successively, when the load reaches its rest position.

In particular the cranes for life boats are characterized by the fact that the boat must always remain in an hooked condition to the blocks of the crane (one or two blocks depending on the fact that the boat is provided with one or two hooks). Therefore the need is present to be able to loosen the lifting cables in order to avoid the permanent deformation and/or the damage of the same if permanently kept under a tensioned condition.

Moreover the current rules for the safety of life at sea (SOLAS) prescribe that the life boats may be put into the sea in any longitudinal arrangement condition (pitch angle) and transverse arrangement condition (roll angle) of the ship, within the maximum provided limits, also in a combined condition one another.

Therefore it is necessary for the block hooking device to ensure a strong and reliable retaining action of the block in any arrangement condition which is provided by the rules and to allow the opening the device and the release of the block also under load conditions. The safety prescriptions impose that the unlock of the block must occur manually or due to the force of gravity and without any contribution of other energy sources which depend on the ship.

Solutions are known, always in conformity with the present law, in which the unlock of the block occurs by means of automatic systems which are supplied by means of a permanently stored energy reserve, as gas pressurized hydraulic devices.

The reliability of the device and therefore of crane itself also depend on the possibility that the hooking of the block occurs in an automatic way, namely without a specific intervention of the operator, any time the block, and therefore the boat, reaches the provided rest position.

In order to avoid accidental lowering of the boat which is arranged in its rest position on the ship, a safety device function against accidental lowering must be provided too.

Problems of the Prior Art

Different locking systems for the block are present which are installed on existing cranes, but in general they make use of the movement of the arms on which the blocks are housed at the end of their maximum lifting stroke.

In case of sea setting systems without movable arms (which in the following are referred to as stationary installations) obviously it is not possible to use these principles and more complex and expensive solutions are used.

The solutions in which the unlock of the block occurs by means of automatic systems supplied by means of electric, hydraulics or pneumatic power are expensive because they need the presence of additional electrical, hydraulic or pneumatic circuits with the complication that such circuits must be supplied by means of a permanently stored energy reserve which must be independent from the energy sources of the ship itself.

In some prior art solutions, when particularly heavy seas conditions are present, the inertia of the block can cause anomalous stresses of the hook of the boat.

Moreover in some cases, possible movements of the block can cause damages to the surrounding installations.

SUMMARY OF THE INVENTION

A purpose of this invention is to avoid the above mentioned drawbacks.

A further aim of the present invention is to supply a locking device which is extremely reliable.

A further aim of the present invention is to allow the exploitation of the rising movement of the block itself to facilitate its locking.

A further aim of the present invention is to allow the exploitation of the lowering movement of the block itself to facilitate its unlocking.

Concept of the Invention

The problem is solved with the characteristics of the main claim.

The dependent claims represent particularly advantageous preferred solutions.

The system uses the rising and lowering movement of the block for the locking and unlocking operations of the same. The unlocking operation of the hooking elements occurs manually following the command of the operator who operates a proper retaining device which in turn allows the movement of the strong leverage which locks the block. For safety reasons, the retaining device of the levers is of the mechanical type, with flexible or rigid connecting devices, pneumatic or hydraulic systems being not excluded, however being in anyway operated manually following the command of the operator. The levers device has therefore a function of a mechanical actuator reducing the efforts applied by the block on the hooking elements.

Advantageous Effects of the Invention

With this solution a simple system is obtained, which is extremely reliable and safe, having a reasonable cost and above all requiring a minimum maintenance.

The strength, reliability and cheapness characteristics of the sea setting systems of life boats direct contribute to individuate the devices with hydraulic actuator and energy reserve with pressurized gas accumulators as the better technical choice.

The device which is thus gathers all these needs and, though being individuated as an optimal solution for the automatic locking of the blocks and for the successive unlocking controlled under load conditions, particularly in the case of the stationary installations for the sea setting of life boats, can be usefully used also for other types of cranes, possibly even intended for other aims.

This system provides a hooking automation even without the use of movable arms being needed, however obtaining an extremely safe and functional device.

Advantageously the device according to the present invention also allows the presence of appropriate adjusting means to recover possible clearances and/or to modify the operation mode of the same.

Apart from the constructive and operative simplicity, the advantage of this automatic device is also its cheapness, because it can be made without any system with reserve of hydraulic, pneumatic or electrical power. A simple system is thus obtained, which is extremely reliable and safe, having a reasonable cost and which, above all, requires a minimum maintenance.

The device which is thus obtained gathers all the safety needs and simplicity for the automatic block of the loads with controlled unlocking function in "on load" conditions or, alternatively, in "off load" conditions of the block, in absence of cranes with movable arms.

Advantageously the movement of the block is used both in the rising condition to lock the levers of the blocking device and in the lowering condition to unlock the levers of the blocking device, after the operator deactivated the retaining mechanism of the same. A direct consequence of the installation of this device is that one can prevent that, when particularly heavy seas conditions are present, the inertias of the block may cause anomalous stresses of the hook of the boat or that possible movements of the same may cause damages to the surrounding installations. This characteristic is particularly appreciable in the case of boats having a high capacity and in which the mass of the blocks is particularly high.

BRIEF DESCRIPTION OF THE DRAWINGS

An embodiment of the invention is now described, by way of example only, with reference to the accompanying drawings in which.

DETAILED DESCRIPTION OF THE INVENTION

Figure 1:
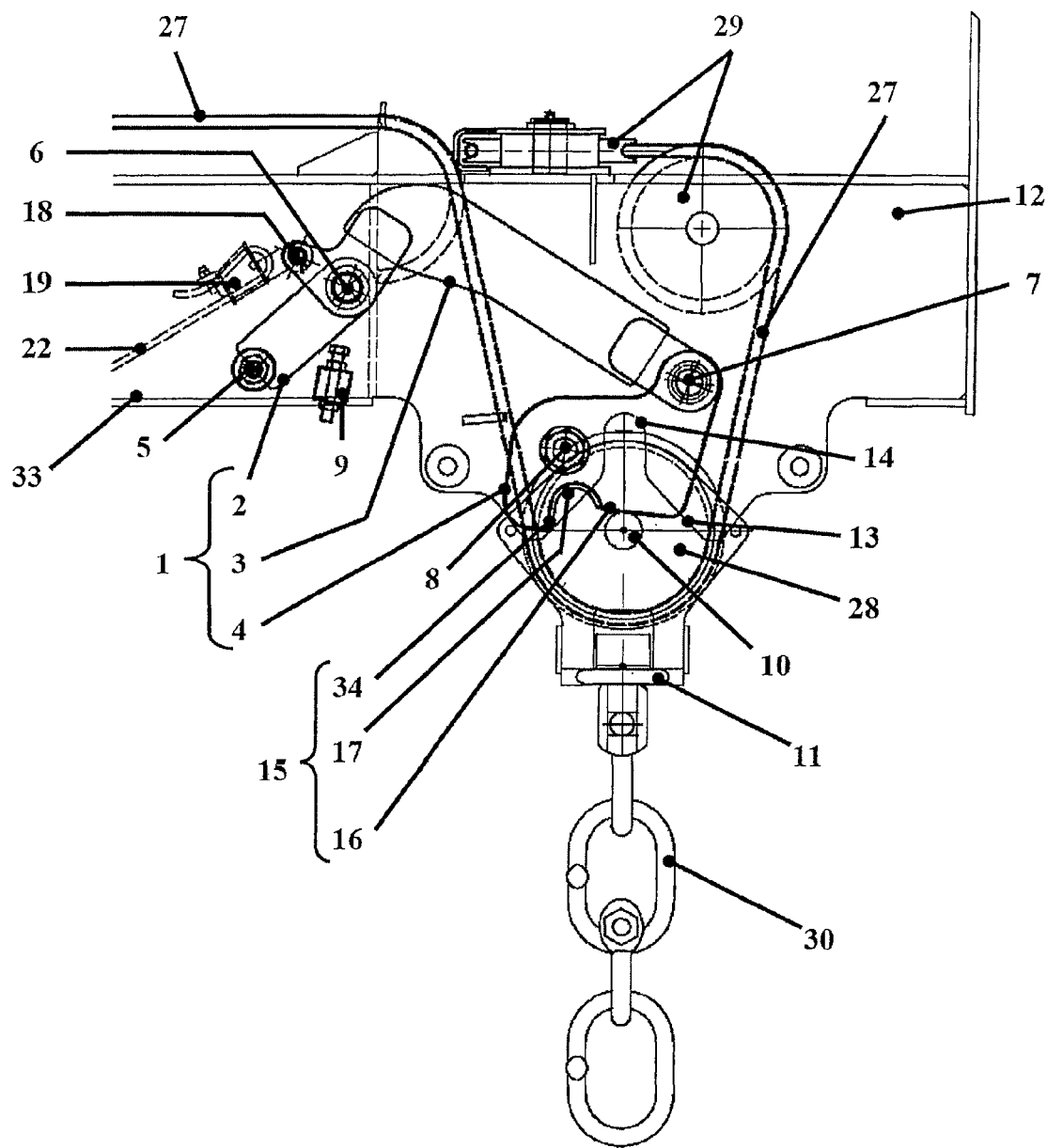
FIG. 1 represents a side-view of the hooking and releasing device made according to the present invention in an unlocking condition, according to a first embodiment.

In its various constructive solutions the hooking/unhooking device (1) of blocks comprises (FIGS. 1, 2, 3, 4, 5) the following parts:

Counteracting lever (2) which is hinged in correspondence with one first end of it by means of a first pin (5) and which is free to rotate around it, this first pin (5) being in a fixed position with respect to the supporting structure (33) of the lifting blocks which is present on the ship, and normally consisting of an arm provided with a housing (12) within which the block (11) is inserted to which the load is fixed by means of fastening means of the load (30);

Connecting rod (3) a first end of which is fixed to the counteracting lever (2) by means of a second pin (6), this first end of the connecting rod (3) being free to rotate around said second pin (6), this second pin (6) being movable with respect to the supporting structure (33) of the lifting blocks which is present on the ship, only the reciprocal constraint among the two respective ends of the connecting rod (3) and counteracting lever (2) being present;

Hooking element (4) a first end of which is fixed to the connecting rod (3) by means of a third pin (7), this first end of the hooking element (4) being free to rotate around said third pin (7), this third pin (7) being movable with respect to the supporting structure (33) of the lifting blocks which is present on the ship, only the reciprocal constraint among the two respective ends of the connecting rod (3) and the hooking element (4) being present; the hooking element (4) has a point of fulcrum (8) and the hooking element (4) is free to rotate around it, this point of fulcrum (8) being in a fixed position with respect to the supporting structure (33) of the lifting blocks which is present on the ship;

Control device (19) which is fixed to the connecting rod (3) by means of a coupling (18).

As it will be explained in the following of the present invention description the shape of the parts (2, 3, 4) of the hooking/unhooking device (1) of blocks according to the present invention and the position of the pins (5, 6, 7) and of the fulcrum (8) are advantageously shaped so that the counter forces which are necessary to maintain the hooks in a stable closed position and the forces which are necessary to the unlock the device will be adequately reduced limiting the pushing force which is required by the mechanism also under load conditions, constituting a primary reduction mechanism of the forces.

Figure 3:
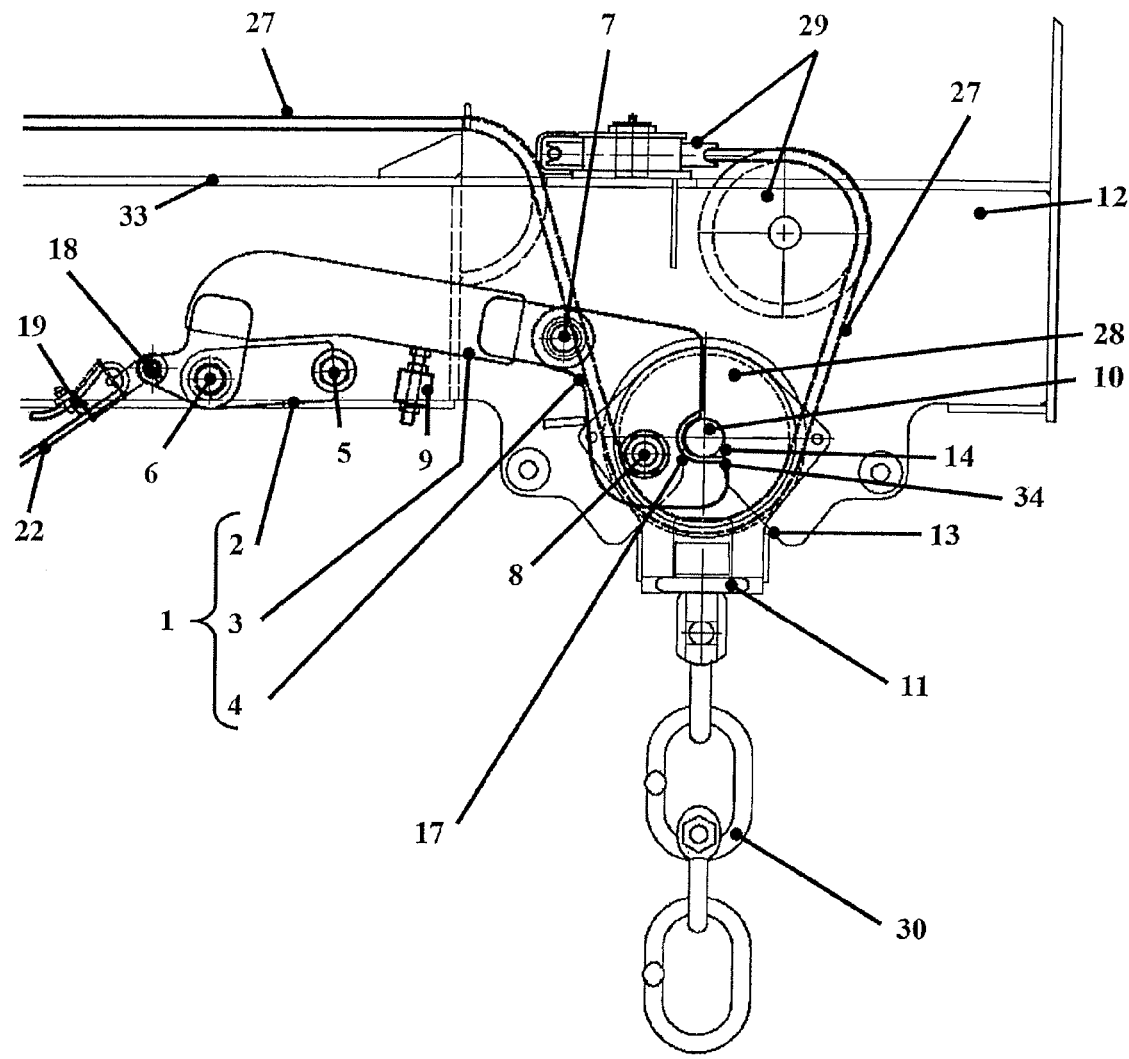
FIG. 3 represents a side-view of the hooking and releasing device of FIG. 1 in a locking condition.
Figure 4:
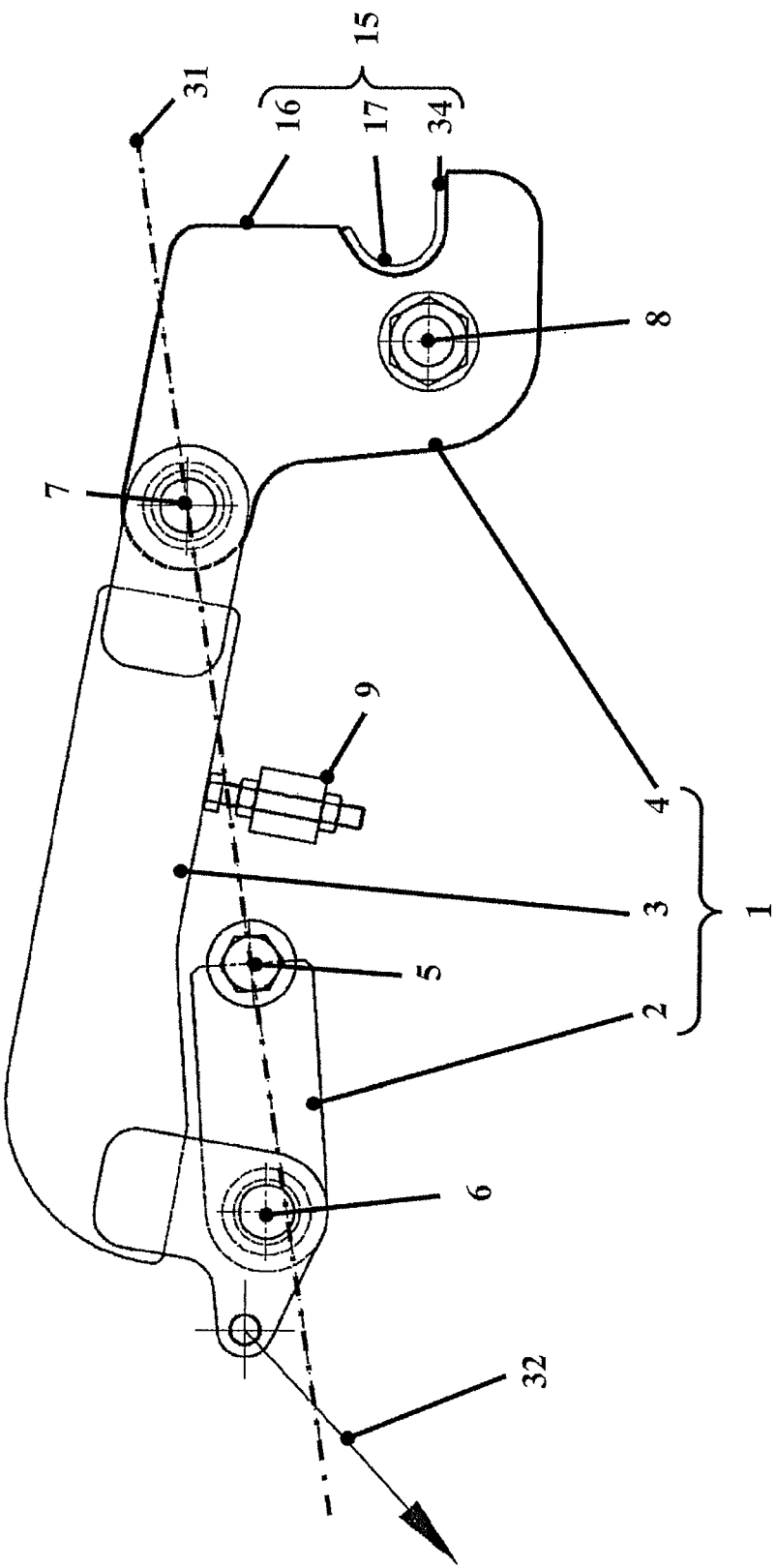
FIG. 4 represents a side detailed view of the hooking and releasing device of FIG. 1.
Figure 5:
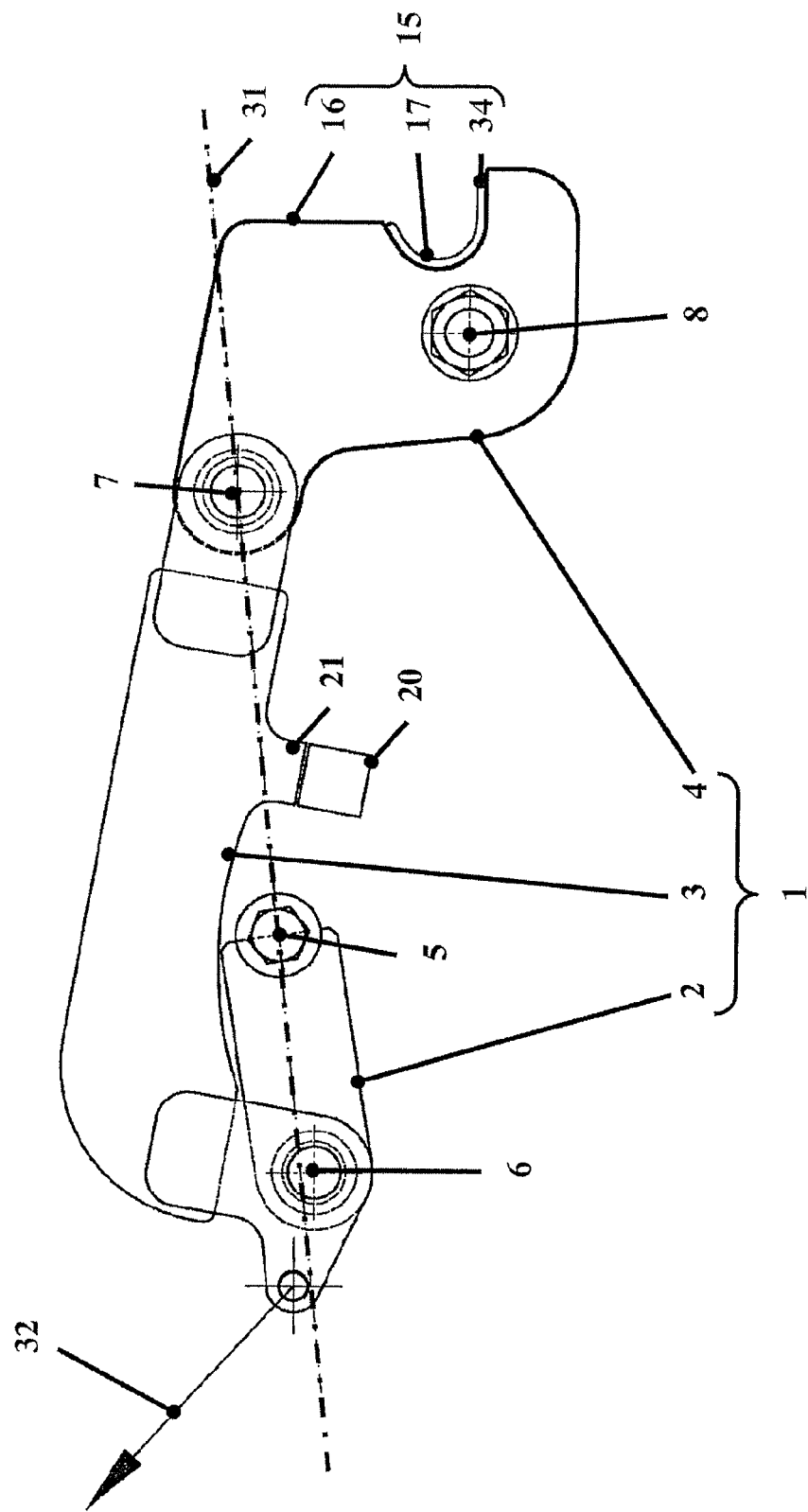
FIG. 5 represents a side detailed view of the hooking and releasing device according to a second embodiment.
Figure 6:
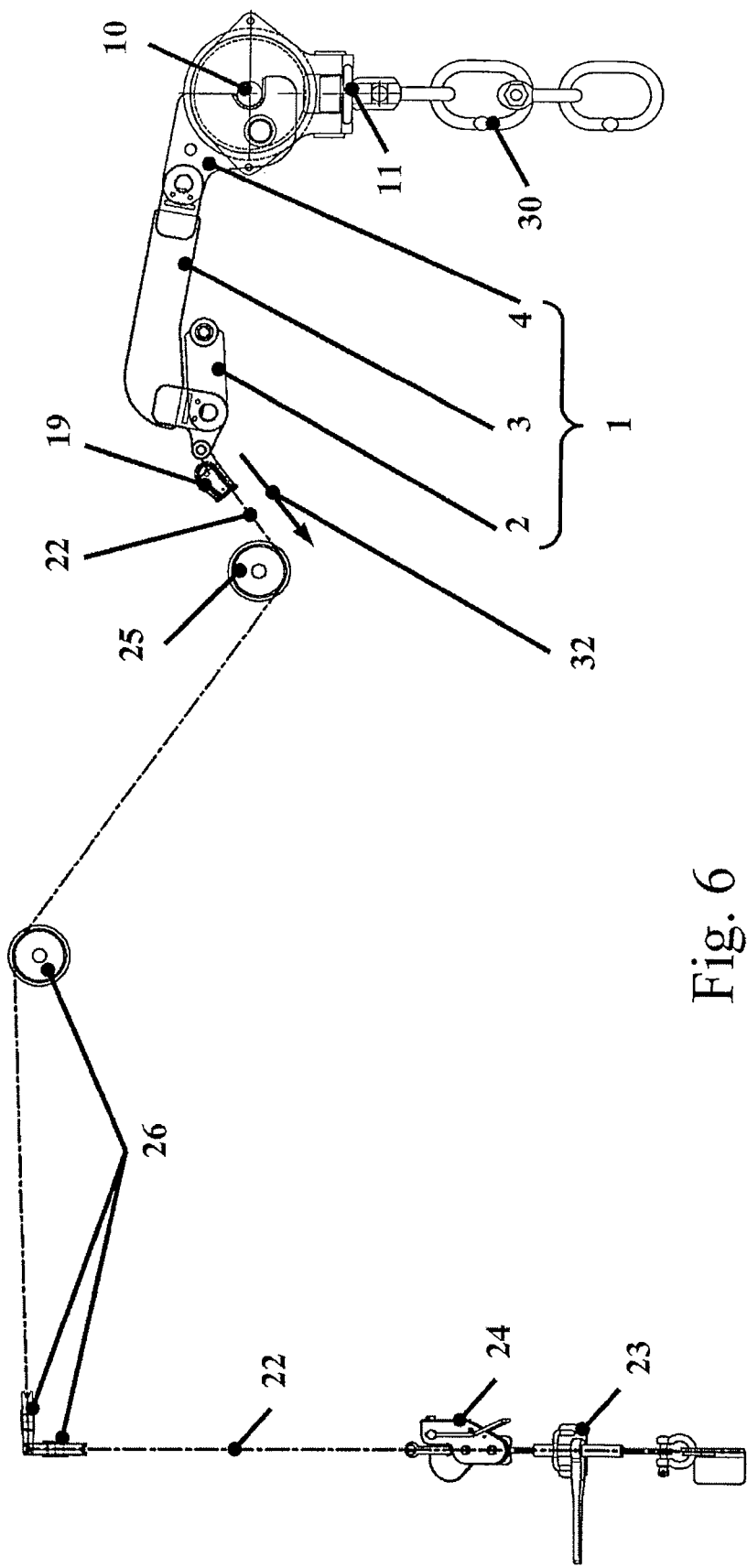
FIG. 6 represents a side view of the hooking and releasing device according to the present invention showing the releasing system.
Figure 7:
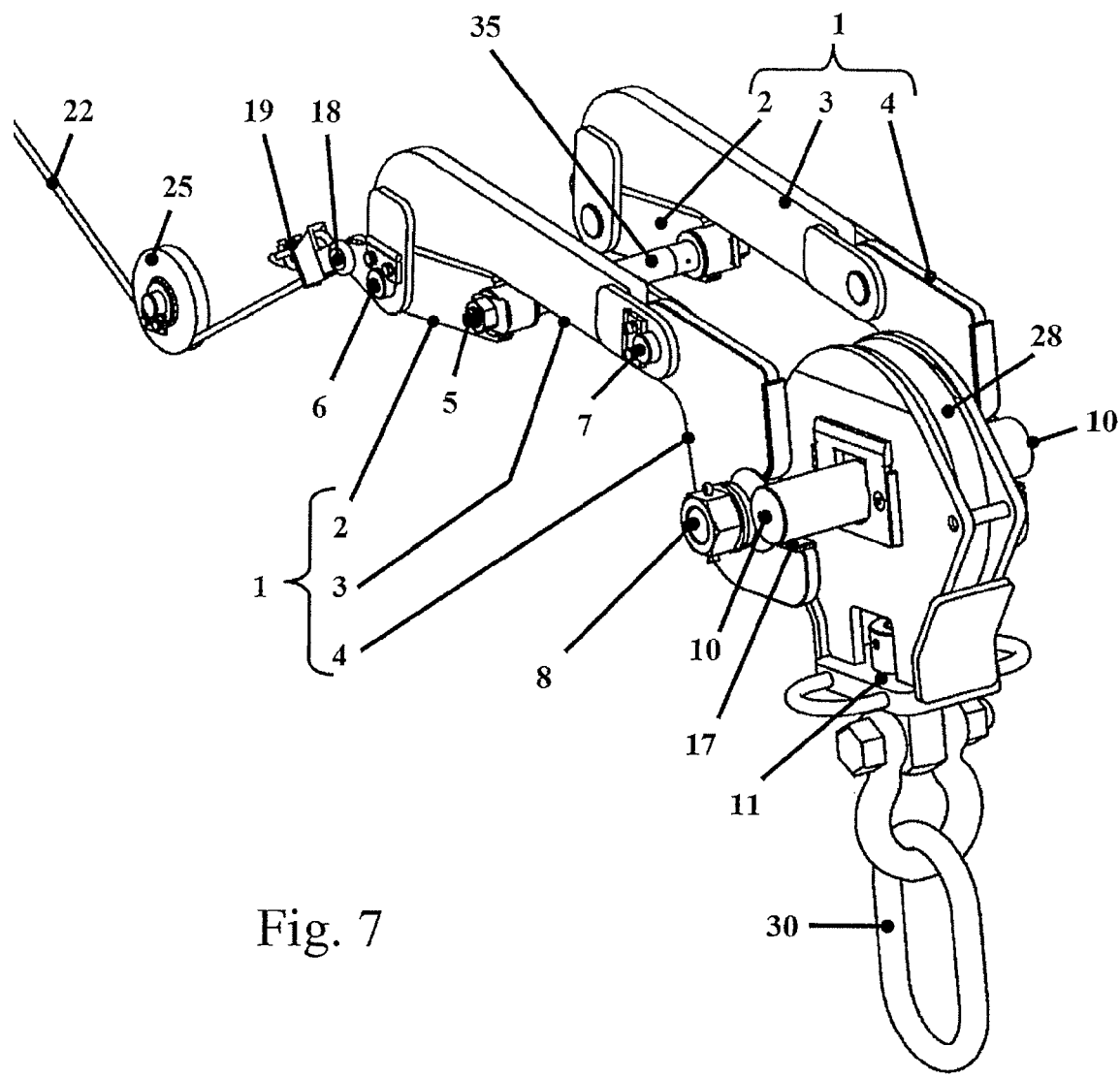
FIG. 7 represents a three-dimensional view of the hooking and releasing device according a third embodiment.

The hooking element (4) is shaped with a hooking profile (15) which is composed by a pushing portion (16), an insertion portion (17) and a tooth (34). By means of the rotation around the fulcrum (8) the hooking profile (15) can be moved from a position in which the hooking profile (15) is approximately in an horizontal position (FIG. 1) to a position in which the hooking profile (15) is approximately in a vertical position (FIG. 3). The pushing portion (16) is shown as a rectilinear portion, but it will be evident that are various configurations are possible without exiting from the domain of the present invention, the pushing portion (16) possibly being even, for example, a curved portion. With the expression "approximately horizontal" or "approximately vertical" is meant that the hooking profile (15) or better the axis representing the longitudinal development of the sequence of the pushing portion (16) and the insertion portion (17) assumes a rotated position by some degrees respectively with respect to the vertical or horizontal direction. For example (FIG. 1) in the horizontal position the axis representing the longitudinal development of the sequence of the pushing portion (16) and the insertion portion (17) assumes a rotated position of 5 degrees with respect to the horizontal direction and (FIG. 3) in the vertical position the axis representing the longitudinal development of the sequence of the pushing portion (16) and the insertion portion (17) assumes a rotated position of 0 degrees with respect to the vertical direction. It will be evident that for each position different rotational angles can be provided, preferably within a range between −10 and +10 degrees, even more preferably within a range between −5 and +5 degrees. Referring to the vertical position it will be evident, from the following of the present description, that the rotational angle of the hooking profile (15) will preferably be such that the tooth (34) constitutes an approximately horizontal supporting surface. Preferably and advantageously the rotation which is present when the hooking profile (15) is in an approximately horizontal position is such that the inclination of the pushing portion (16) drives the engaging elements (10) or protrusions towards the insertion portion (17).

Figure 8:
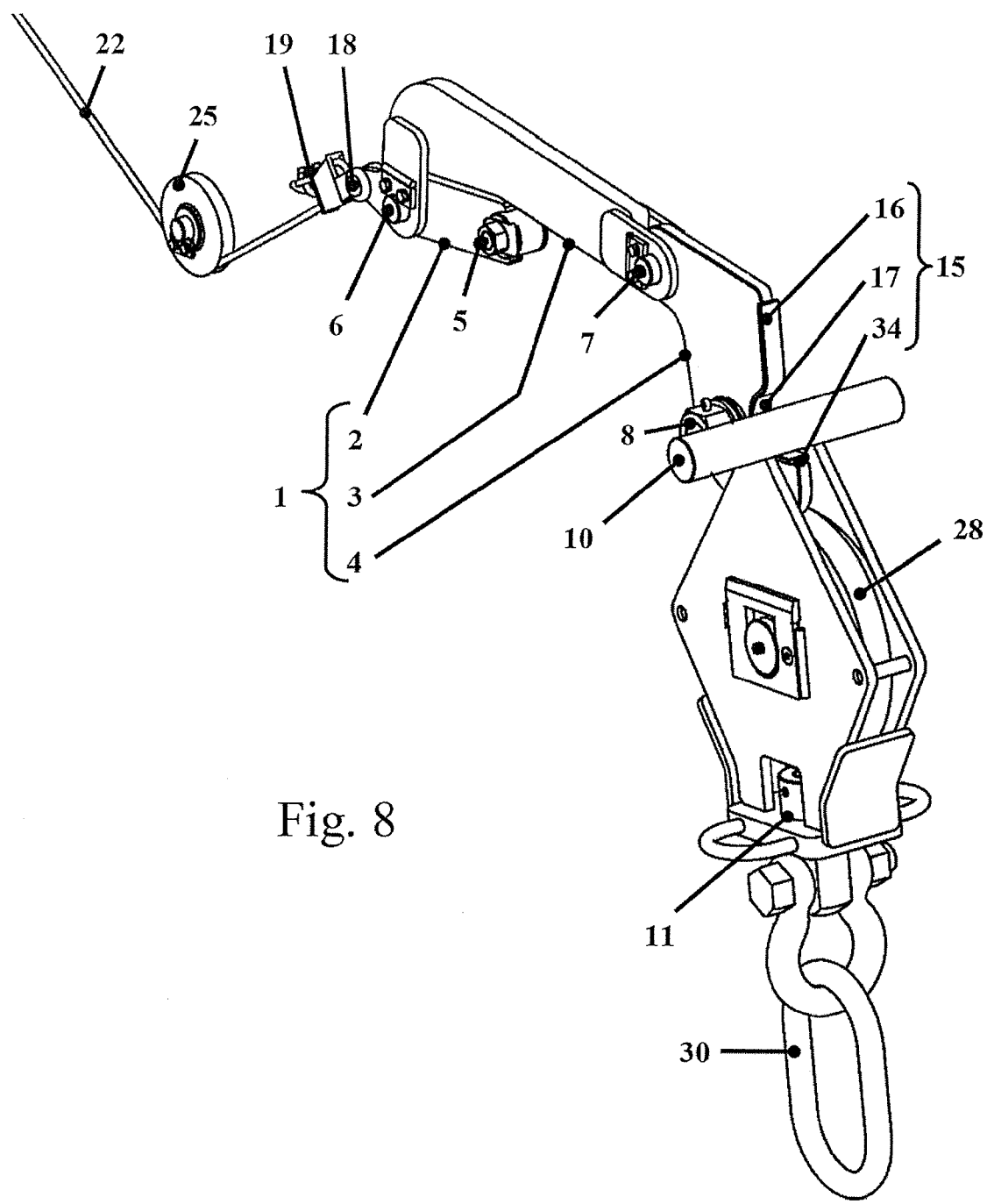
FIG. 8 represents a three-dimensional view of the hooking and releasing device according to a fourth embodiment.

The block (11) intended for the use with the automatic hooking device with controlled releasing operation according to the present invention includes (FIGS. 1, 2, 3, 7, 8) a third connecting pulley (28) of the second cable (27) or lifting/furling cable and at least one engaging element (10), for example, as in the represented case (FIGS. 1, 2, 3, 7) at least one protrusion (10) which can be a bar or a couple of bars intended to abut in a support condition on the tooth (34) and at least partially inserted within the insertion portion (17) of the hooking profile (15) of the hooking element (4). Fourth connecting pulleys (29) will drive the second cable (27) or lifting/furling cable to the fixing position. In the preferred embodiment (FIGS. 1, 2, 3, 7) of the present invention the engaging element (10) is composed at least by one side protrusion of the pin of the third pulley (28), preferably a couple of protrusions, one for each side of the third pulley (28). However, in alternative embodiments (FIG. 8) the engaging element (10) can be an element of the block (11) which is a separate element with respect to the pin of the third pulley (28) and which is fixed on the block (11).

The hooking phase of the block (11) occurs in an automatic way raising the block (11) itself, namely the load which is fixed to the block (11) itself.

The supporting structure (33), namely the fixed arm which is intended to support the load, is provided with a housing (12) of the block (11). The supporting structure (33) is provided, in correspondence of the housing (12) with a guide (13), which in the illustrated embodiment is a couple of inclined guides reciprocally converging toward an end groove (14) which is intended for the insertion of the engaging element (10). in practice the assemble of inclined guides and end groove (14) forms a guide (13) which is shaped like an overturned "Y" in which the reciprocally converging arms of the "Y" shape form the couple of inclined guides and the vertical arm of the "Y" shape forms the end groove (14). In this way during the lifting of the block (11), a guiding action of the engaging element (10) is present, which is guided and centered being obliged to converge into the end groove (14), rotating and automatically re-aligning, if needed, the block (11) itself.

In general the guides (13) will force the possibly spin or sideways misaligned blocks to assume the correct entrance position during the lifting phase. This precaution is needed because the cables can have internal torsion forces, which can cause the block to assume a rotated position with respect to its own vertical axis even near the suspension pulleys.

In the preferred embodiment of the present invention (FIG. 7), the hooking/unhooking device (1) has a double configuration, namely a couple of hooking/unhooking devices (1) work in a reciprocally coordinated way to make the hooking/unhooking functions on a respective engaging element (10) or protrusion. In particular the two hooking/unhooking devices (1) are placed one on the right side and one on the left side of the housing (12) of the block (11). Both hooking elements (4) are hinged in correspondence of the fulcrum (8), which is opportunely fixed in order to allow the engaging elements (10) or protrusions of the block to rotate the hooking elements (4) themselves when the engaging elements (10) or protrusions are raised or lowered. The rotation of the hooking elements (4) causes their closure during the lifting of the block (11) and the rotation of the hooking elements (4) causes their opening during the lowering of the block (11). The hooking elements (4) have a hooking profile (15) which is shaped at the bottom side and on the pushing portion (16) of which the engaging elements (10) or protrusions of the block (11) abut during its rising, applying the pushing action which causes the rotation of the hooking elements (4) around the fulcrum (8). This hooking profile (15) ends with an insertion portion (17) or concavity which hooks the engaging elements (10) or protrusions of the block (11) at the end of its rising, when each hooking element (4) is in the closed position. If the hooking/unhooking device (1) is unlocked, the concave insertion portion (17) of the hooking profile (15), under the downwardly pushing action of the engaging elements (10) or protrusions, forces the hooking element (4) to open again when the block (11) starts to be lowered.

In a coordinated way with the above described rotation movement of the hooking elements (4), a strong locking connecting rod (3) moves, which is hinged at one of its two ends to the respective hooking element (4) by means of the third pin (7) and which is also hinged to the counteracting lever (2) at the other of its two ends by means of the second pin (6). The connecting rod (3) is movable, being forced to assume the position which is determined by the third pin (7) and by the second pin (6) which are movable pins, meaning that they are not engaged to the supporting structure (33), only the reciprocal constraint being present between the two respective ends of the elements which are connected by means of such pins, namely connecting rod (3) and hooking element (4) for the third pin (7) and instead connecting rod (3) and counteracting lever (2) for the second pin (6).

Due to ease of construction reasons, but not in an exhaustive way, on one of the two connecting rods, the coupling (18) of the control device (19) is present which has the function to retain or unlock the locking device, depending on the adopted configuration, as it will be explained in the following of the present description. It will be evident that the coupling (18) of the control device (19) can be also obtained on another of the elements which form the hooking/unhooking device (1), obtaining the same action and function. For example the control device (19) can be indifferently connected to the connecting rod (3) or to the counteracting lever (2).

The counteracting lever (2) has the function to oppose to the action of the hooking element (4), which is transmitted by the connecting rod (3). In the preferred embodiment (FIG. 7) with a double locking device, the two counteracting levers (2) which are placed on each side of said supporting structure (33) or of the housing (12) of the block (11) are mechanically locked in correspondence of the first pin (5) by means of a connecting element (35), which therefore acts as a synchronization element between the hooking/unhooking device (1) on the right side and the hooking/unhooking device (1) on the left side of the represented mechanism.

The control device (19) ensures the stable closure of the entire hooking device until the operator gives the command to release making the levers system free to be moved. In the illustrated embodiment (FIGS. 1, 2, 3, 6, 7, 8), the control device (19) is made by means of a coupling (18) and it is connected to a first cable (22) which, by means of a first pulley (25), applies its action in the application direction of the corresponding force (32). It will be however evident that other different solutions can be used with reference to the represented cable system, such solutions being functionally equivalent with respect to the aim of the present invention.

Furthermore, in the preferred embodiment of the present invention (FIGS. 1, 2, 3, 5) the hooking/unhooking device (1) can include an adjustable register (9) which for example can consist of an adjustable screw which has the function to stop the levers in the closing position of the hooking/unhooking device (1) itself. This solution, as it will be explained in the following of the present description, also allows to adjust the hooking/unhooking device (1) according to different operating modes. Alternatively (FIG. 4) the hooking/unhooking device (1) can include a fixed register (20) able to define the closing position of the hooking/unhooking device (1) by means of a rabbet position on a corresponding striker plate (21).

Figure 2:
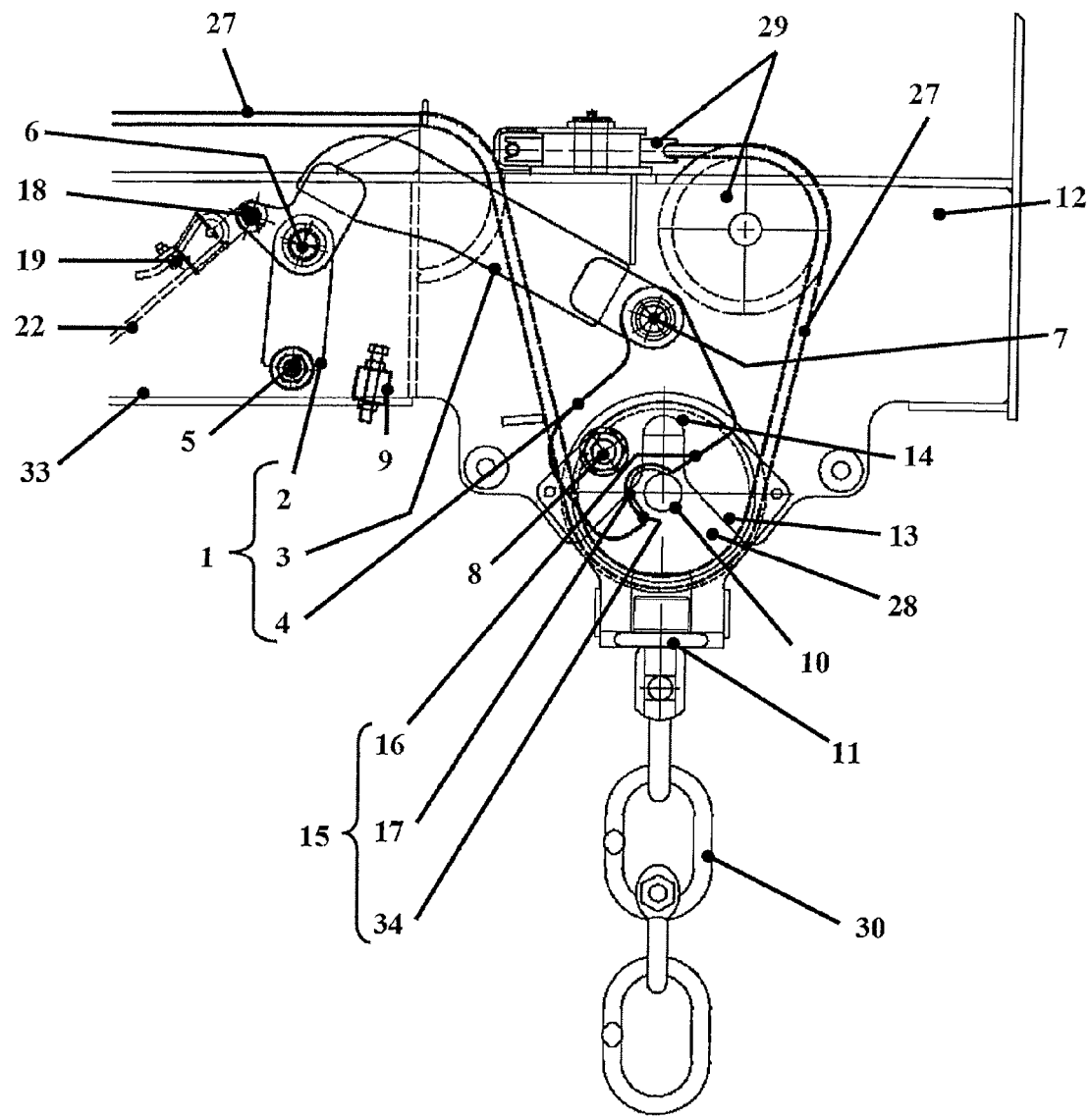
FIG. 2 represents a side-view of the hooking and releasing device of FIG. 1 in an intermediate condition between the unlocking condition and the locking condition.

If one observes the sequence of the images of the FIGS. 1, 2, 3 in the indicated order, it is possible to follow the closing steps of the hooking/unhooking device (1), while observing the sequence of the images of the FIGS. 1, 2, 3 in the reversed order one can follow the opening steps of the hooking/unhooking device (1).

Relatively to the closing phase of the hooking/unhooking device (1), in the first image (FIG. 1), which corresponds to the "unlocking" condition, the engaging elements (10) or protrusions of the block (11), opportunely directed by the inclined guides (13) enter in the respective end grooves (14) of the previously described shape with an overturned "Y" shape. The engaging elements (10) or protrusions of the block (11) then remain in an hooked condition in the concave insertion portion (17) of the hooking profile (15) of the hooking elements (4), which are forced to rotate upwards. Consequently the connecting rod (3) moves causing the counteracting lever (2) to rotate towards the left direction. This concatenated sequence of movements fulfills the closing automation of the hooking/unhooking device (1) of the block (11).

In the second image (FIG. 2), which corresponds to the "insertion" condition, an intermediate phase is represented of the movement of the hooking/unhooking device (1) of the block (11).

In the third image (FIG. 3), which corresponds to the "locking" condition, the end configuration is represented of the hooking/unhooking device (1) of the block (11). In this condition the engaging elements (10) or protrusions of the block (11) now reached the mechanical rabbet position on the bottom of the end grooves (14) and the hooking elements (4) with the respective counteracting levers (2) are completely rotated in a closed position. In the particular represented solution, the registering device (9, 20), regardless of the fact that it is fixed (20) or adjustable (9), comes into an abutment condition with the connecting rod (3). However, it will be evident that the registering device (9, 20) can indifferently block the movement of any mechanical part of the leverage constituting the hooking/unhooking device (1) of the block (11).

Vice-versa, relatively to the opening phase of the hooking/unhooking device (1), the lowering movement of the engaging elements (10) or protrusions of the block (11) starting (FIG. 3) from the "locking" condition or position, will cause (FIG. 2) the progressive downward rotation of the hooking elements (4). Consequently the connecting rod (3) moves causing the counteracting lever (2) to rotate rightward. Finally the "unlocking" condition is reached (FIG. 1), in which the engaging elements (10) or protrusions of the block (11), after completing their own stroke within the end groove (14) of the previously described shape with an overturned "Y" shape, they are free to go down, being no more engaged in any way to the hooking/unhooking device (1).

Therefore the hooking/unhooking device (1) of the block (11) according to the present invention is shaped in order to automatically open and close under the pushing action of the block (11).

The levers system offers the best guarantees relatively to strength, long life, reliability and mechanical efficiency, which is intended as a relation between the force which is applied to unlock the mechanism and the load which is applied to the block. Indeed the levers system allows to minimize the frictions (exclusively of the rolling type) and to carry out at the same time a further reduction of the forces which are necessary for the unlocking operation under load conditions (forces secondary reduction mechanism).

The hooking/unhooking device (1) of the block (11) according to the present invention is shaped in order to allow also different operating modalities.

In the preferred configuration of the present invention the hooking/unhooking device (1) of the block (11) is shaped in such a way that the axes of the first pin (5) which is a fixed one, second pin (6) which is a movable one and third pin (7) which is a movable one, are in a reciprocally aligned condition or little deviated from the reciprocally aligned condition. In this way, the force (32) which the control device must apply is much lower with respect to the action which is transmitted by the block (11) to the hooking elements (4).

Relatively to the reciprocally aligned condition of the axes of first pin (5) which is a fixed one, second pin (6) which is a movable one and third pin (7) which is a movable one, different configurations are possible in which this reciprocally aligned condition of the axes is as a matter of fact a reciprocally approximately aligned condition of the axes, essentially three cases being possible.

In particular in the first case (FIG. 5), the hooking/unhooking device (1) of the block (11) can be configured so that in the closing position the axis of the second pin (6), which is a movable one, is on the upper part with respect to the prolongation of the straight line of conjunction (31) which passes through the axes of third pin (7), which is a movable one, and first pin (5), which is a fixed one, namely it is on the same side of the connecting rod (3) with respect to the prolongation of the straight line of conjunction (31) which passes through the axes of third pin (7), which is a movable one, and first pin (5), which is a fixed one. In this way the hooking/unhooking device (1) can spontaneously open under the action of the load which is applied to the block (11), even if with a high reduction ratio of the efforts between the jaws and the retaining device. Therefore in this case the force (32) applied by the control device (19) is essentially a retaining force and the control device (19) works in a releasing way. This case is indicated as hooking/unhooking device (1) to be opened under loaded conditions, "on load".

In particular in the second case (not represented), the hooking/unhooking device (1) of the block (11) can be configured so that in the closing position the axis of the second pin (6), which is a movable one, is essentially aligned with the prolongation of the straight line of conjunction (31) which passes through the axes of third pin (7), which is a movable one, and first pin (5), which is a fixed one. In this case the equilibrium is stable and no matter how high is the load which is applied to the block (11), it will be no more able to cause spontaneous openings of the hooking/unhooking device (1), but one will need to apply a force (32) in order to start the movement by means of the control device (19).

In particular in the third case (FIG. 4), the hooking/unhooking device (1) of the block (11) can be configured so that in the closing position the axis of the second pin (6), which is a movable one, is below with respect to the prolongation of the straight line of conjunction (31) which passes through the axes of third pin (7), which is a movable one, and first pin (5), which is a fixed one, namely is on the opposed side of the connecting rod (3) with respect to the prolongation of the straight line of conjunction (31) which passes through the axes of third pin (7), which is a movable one, and first pin (5), which is a fixed one. In this case the hooking/unhooking device (1) is in a permanently closed configuration. Also in this case one will be needed to apply a force (32) in order to start the movement by means of the control device (19), but with respect to the second case this force (32) to be applied should be greater to allow to overcome the permanent closing condition, namely the applied force (32) should be so high to bring the axis of the second pin (6), which is a movable one, until a condition in which it is located on the upper part with respect to the prolongation of the straight line of conjunction (31) which passes through the axes of third pin (7), which is a movable one, and first pin (5), which is a fixed one, namely until a condition in which it is located at the same side of the connecting rod (3) with respect to the prolongation of the straight line of conjunction (31) which passes through the axes of third pin (7), which is a movable one, and first pin (5), which is a fixed one. Once this condition is reached, the hooking/unhooking device (1) will spontaneously proceed the opening action by means of the effects of the load which is applied to the block (11). This case is indicated as hooking/unhooking device (1) of the "off load" type. This particular operating modality obliges the operator to tighten up the second cables (27) or lifting/furling cables before unhooking the blocks (11) and before proceeding with the furling of the life-boats. Indeed, since it is possible to release the second cables (27) or lifting/furling cables when the hooking/unhooking device (1) is closed, it is possible for the "on load" opening to cause a temporary fall of the boat due to the height which is allowed by the slack of the second cables (27) or lifting/furling cables. The kickback due to the violent stopping of the boat, following the sudden tensioning of the second cables (27) or lifting/furling cables, could therefore cause injuries to the passengers or damages to the boat. In the "off load" opening mode, the action of the control device (19) is counteracted by the weight of the boat which is hooked to the block (11). Since it is provided that the second always prevails on the first one, both when the boat is in an empty condition or it is in a full load condition, even operating on the control device (19) the lock system will not open if it is in an under load condition. In order to unlock it, the operator will necessarily need to tense the cables again and discharge the block (11). Then maintaining the control device (19) in an opened position, he will have to furl the blocks (11) and, therefore, the boat together with them.

The presence of an adjustable register (9) conveniently allows to adjust the hooking/unhooking device (1) for "on load" opening operation or "off load" opening operation, simply adjusting in an corresponding way the abutment position of the corresponding element of the hooking/unhooking device (1). As previously observed, while in the particular represented solution, the adjustable register (9) comes into an abutment condition with the connecting rod (3), it will be evident that the adjustable register (9) can indifferently block the movement of any mechanical part of the leverage constituting the hooking/unhooking device (1) of the block (11). In practice acting on the adjustable register (9) one can correspondingly regulate the rabbet position of the corresponding element of the hooking/unhooking device (1) in such a way that the axis of the second pin (6), which is a movable one, is:

on the upper part with respect to the prolongation of the straight line of conjunction (31) which passes through the axes of third pin (7), which is a movable one, and first pin (5), which is a fixed one, namely it is on the same side of the connecting rod (3) with respect to the prolongation of the straight line of conjunction (31) which passes through the axes of third pin (7), which is a movable one, and first pin (5), which is a fixed one;

essentially aligned with the prolongation of the straight line of conjunction (31) which passes through the axes of third pin (7), which is a movable one, and first pin (5), which is a fixed one;

below with respect to the prolongation of the straight line of conjunction (31) which passes through the axes of third pin (7), which is a movable one, and first pin (5), which is a fixed one, namely is on the opposed side of the connecting rod (3) with respect to the prolongation of the straight line of conjunction (31) which passes through the axes of third pin (7), which is a movable one.

Alternatively one can use (FIG. 4) a fixed register (20) which can be preliminarily set once for all during the construction phase according to an operating mode in which the axis of the second pin (6), which is a movable one, is:

on the upper part with respect to the prolongation of the straight line of conjunction (31) which passes through the axes of third pin (7), which is a movable one, and first pin (5), which is a fixed one, namely it is on the same side of the connecting rod (3) with respect to the prolongation of the straight line of conjunction (31) which passes through the axes of third pin (7), which is a movable one, and first pin (5), which is a fixed one;

essentially aligned with the prolongation of the straight line of conjunction (31) which passes through the axes of third pin (7), which is a movable one, and first pin (5), which is a fixed one;

below with respect to the prolongation of the straight line of conjunction (31) which passes through the axes of third pin (7), which is a movable one, and first pin (5), which is a fixed one, namely is on the opposed side of the connecting rod (3) with respect to the prolongation of the straight line of conjunction (31) which passes through the axes of third pin (7), which is a movable one.

As it was previously underlined, the hooking/unhooking device (1) can have a double configuration (FIG. 7), namely the hooking device can be made of the connection of two identical hooking/unhooking devices (1), which are symmetrically located with respect to the block and to the fixed arm.

In different embodiments, instead, it is possible to have (FIG. 8) a configuration with single hooking/unhooking device (1) which hooks on the upper part the block (11). In this case, the side parts of the engaging elements (10) or protrusions have the function to guide the block (11) during the rising movement, while the central part of the engaging elements (10) or protrusions has the function to get in touch with the single central hooking element (4) which is oriented in the correct way.

The retaining system obtained by means of the first cable (22) can, in one embodiment which is reported (FIG. 6) with an explicative and not limitative purpose, be obtained by means of:

a first pulley (25) which defines the correct application direction of the force (32) whether the device is configured as an "on load" device or as an "off load" device;

second connecting pulleys (26);

tightener (23);

quick release hook (24).

In this configuration the operator blocks the hooking/unhooking device (1) of the block (11) putting into a tensioned condition the first cable (22) by means of the tightener (23), after the quick release hook (24) has been hooked. The unlock of the hooking/unhooking device (1) occurs almost instantly by releasing the hook (24) and thus freeing the end of the first retaining cable (22) which, since it does not apply any more a pulling action on the control device (19), releases it, making the levers of the hooking/unhooking device (1) free to open according to the specific provided mode.

In conclusion, therefore, the hooking/unhooking device (1) of the block (11) according to the present invention uses the ascending movement of the block to carry out the hooking action. During the last part of the rising movement, the block (11) enters into a housing (12) which is obtained on the supporting structure (33) that, besides housing part of the block (11), it drives the movement. During this guided movement, which brings the block (11) to a mechanical abutment condition at its seat or housing (12), therefore the self-locking of the hooking/unhooking device (1) occurs, due to the direct action of the body of the block (11), or proper engaging elements (10) or protrusions connected to the body of the block (11) itself.

The maintaining of the blocking state of the block (11) is ensured by a levers device which, acting against the opening of the hooking elements (4), stabilize the clamping until the operator intervenes on the controlled unlocking device or control device (19).

The levers device which blocks in a closing condition the hooking elements (4) can be opportunely calibrated in order to allow the automatic release in "on load" conditions of the block (11) during the furling operation, or the unlock in "off load" conditions of the hooking elements (4) before the furling of the block (11) itself starts, selectively locking the possibility to obtain an "on load" furling of the block (11).

The unlocking of the hooking elements (4) is manually determined by the operator who operates a proper control device (19) which in turn allows the movement of the strong levers system which blocks the hooking elements (4) of the block (11). Due to safety reasons, the control device (19) or retaining device of the levers is of the mechanical type, with flexible or rigid connecting devices, pneumatic or hydraulic systems being not excluded, however being in anyway operated manually following the command of the operator. The levers device has therefore a function of a mechanical actuator reducing the efforts applied by the block (11) on the hooking elements (4).

In the case in which pneumatic or hydraulic systems are used, they will preferably be of type supplied by means of an energy reserve and mainly remotely controlled, which are the devices for ordinary service, or those which are regularly used in the normal operating conditions. The unlocking devices which are instead operated by manual type mechanisms will be used in the case of an emergency, being it intended as a forced releasing situation in the case of a fault of the ordinary releasing device. For example the unlocking device can be a hydraulic cylinder which, at the unlocking command, will be readily supplied with the pressurized fluid which is supplied by the system with energy reserve, which in turn comprises an accumulator which is pressurized with an inert gas. Depending on the specific requirements of the application and of the loads which are applied to the block, the hydraulic circuit can be of the open type, namely connected to a hydraulic unit which recharges the accumulator each time the actuator cylinder is actuated, or of the closed type in which the pressurized fluid flows from the accumulator, generally of the bladder type, to the cylinder and vice-versa.

Therefore, in general, the present invention relates to an automatic hooking device with controlled releasing operation for blocks (11) for ships, boats, vessels or equivalent means for transportation of both goods and passengers, comprising first hooking means (4) of engaging elements (10) of the block (11) which are operated only by the ascending movement of the block (11), intended for the fixing on a supporting structure (33) of the lifting blocks. The automatic hooking device with controlled releasing operation comprises at least one hooking/unhooking device (1) consisting of a system of movable levers (2, 3, 4) which are reciprocally interconnected by means of pins (5, 6, 7). The system of movable levers (2, 3, 4) is shaped to carry out a movement between at least two end positions of which:

a first position in which the hooking/unhooking device (1) is in an engagement condition of the engaging elements (10)

a second position in which the hooking/unhooking device (1) is in a release condition of the engaging elements (10), in this engagement condition of the engaging elements (10) the axes of the pins (5, 6, 7) being in a condition close to reciprocal alignment condition of the pins (5, 6, 7) according to a certain alignment/misaligning degree of the pins (5, 6, 7) themselves.

In particular in the engagement condition of the engaging elements (10) the first pin (5) is in between with respect to second pin (6) and third pin (7). In the release condition of the engaging elements (10) the second pin (6) is in between with respect to first pin (5) and third pin (7).

The hooking/unhooking device (1) further includes a control device (19) fixed to one of the elements of the system of movable levers (2, 3, 4) by a coupling (18). The force (32) applied to the control device (19) alternatively constitutes a retaining force of the engagement condition of the hooking/unhooking device (1) or it constitutes a force starting the releasing movement of the hooking/unhooking device (1) according to the alignment/misaligning degree which is present in the condition close to reciprocal alignment condition of said pins (5, 6, 7).

As it was previously explained, the alignment/misalignment degree which is present defines and configures the hooking/unhooking device (1) as a hooking/unhooking device (1) to be opened in an "on load" condition, or as a hooking/unhooking device (1) in an equilibrium condition, or as a hooking/unhooking device (1) of the "off load" type.

The description of this invention has been made with reference to the enclosed figures showing a preferred embodiment of the invention itself, but it is evident that many alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. An automatic hooking device with controlled releasing operation for blocks for ships, boats, and vessels, comprising: a first hooking element having an engaging member, a block said hooking element operated by ascending movement of said block, and fixed on a supporting structure for at least one lifting block, at least one hooking/unhooking device having a system of movable levers reciprocally interconnected by pins having an axis, said system of movable levers adapted to move between at least two end positions, wherein one of said two end position is a first position in which said hooking/unhooking device is an engagement condition of said engaging member and one of said two end positions is a second position in which said hooking/unhooking device is a release condition of said engaging member, such that said engagement condition of said engaging member the axes of said pins being in a condition close to reciprocal alignment condition of said pins according to a certain alignment/misalignment degree of said pins, said system of movable levers is a plurality of lever elements which are reciprocally interconnected made of:
  a counteracting lever having two ends, a first end hinged in correspondence with one its first end by a first pin and free to rotate around said first pin, said first pin in a fixed position with respect to said supporting structure of said at least one lifting block;
  a connecting rod having two ends a first end fixed to said counteracting lever by a second pin, said first end of said connecting rod free to rotate around said second pin, said second pin movable with respect to said support structure, only the reciprocal constraint being present between the two respective ends of each said connecting rod and said counteracting lever;
  said hooking element having two ends, a first end fixed to said connecting rod by a third pin, said first end of said hooking element free to rotate around said third pin, said third pin movable with respect to said supporting structure, only the reciprocal constraint being present between the two respective ends of each said connecting rod and said hooking element, said hooking element having a fulcrum point and said hooking element free to rotate around said fulcrum point, said fulcrum point in a fixed position with respect to said support structure;
in said engagement condition of said engaging member said first pin in between said second pin and third pin, in said release condition of said engaging member said second pin in between said first pin and third pin, said hooking/unhooking device having a control device fixed to one of the elements of said system of movable levers by a coupling, a force applied to said control device constituting a retaining force in said engagement condition of said hooking/unhooking device and constituting a releasing force when starting a releasing movement of said hooking/unhooking device according to the alignment/misalignment degree which is present in said condition close to reciprocal alignment condition of said pins.

2. The automatic hooking device with controlled releasing operation for blocks according to claim 1 wherein said alignment/misalignment degree which is present in said condition close to reciprocal alignment condition of said pins defines and configures said hooking/unhooking device as a hooking/unhooking device to be opened in an on load condition, or as a hooking/unhooking device in an equilibrium condition, or as a hooking/unhooking device of the off load type.

3. The automatic hooking device with controlled releasing operation for blocks according to claim 1 wherein, in said engagement condition of said engaging member, the axes of said pins are in said condition close to reciprocal alignment condition of said pins in which the axis of said second pin is on the upper part with respect to a prolongation of a straight line of conjunction which passes through the axes of said third pin and of said first pin, and on the same side of said connecting rod with respect to the prolongation of the straight line of conjunction which passes through the axes of said third movable pin and of said first fixed pin.

4. The automatic hooking device with controlled releasing operation for blocks according to clam 1 wherein, in said engagement condition of said engaging member, the axes of said pins are in said condition close to reciprocal alignment condition of said pins in which the axis of said second pin is essentially aligned with a prolongation of a straight line of conjunction which passes through the axes of said third pin and of said first pin.

5. The automatic hooking device with controlled releasing operation for blocks according to claim 1 wherein, in said engagement condition of said engaging member, the axes of said pins are in said condition close to reciprocal alignment condition of said pins in which the axis of said second pin is below with respect to a prolongation of a straight line of conjunction which passes through the axes of said third pin and of said first pin, namely it is on the opposed side of said connecting rod with respect to the prolongation of the straight line of conjunction which passes through the axes of said third pin and of said first pin.

6. The automatic hooking device with controlled releasing operation for blocks according to claim 1 wherein said control device is a cable control device which is controlled by a first control cable.

7. The automatic hooking device with controlled releasing operation for blocks according to claim 6 further comprising at least one first pulley, said first pulley defining an application direction of an operating force of said hooking/unhooking device.

8. The automatic hooking device with controlled releasing operation for blocks according to claim 7 wherein said cable control device comprises a second connecting pulley, a tightener, a quick release hook, said tightener tensioning said first cable and locking said hooking/unhooking device after hooking to said quick release hook.

9. The automatic hooking device with controlled releasing operation for blocks according to claim 1 further comprising a register device, said register device having an end rabbet element on one of said plurality of lever elements in correspondence with said engagement condition of said engaging member, the end rabbet element between said register device and said one of the elements of said system of movable levers defining said condition close to reciprocal alignment condition of said pins.

10. The automatic hooking device with controlled releasing operation for blocks according to claim 9 wherein said register device is an adjustable register.

11. The automatic hooking device with controlled releasing operation for blocks according to claim 9 wherein said register device is a fixed register to reach said condition close to the reciprocal alignment condition of said pins by a rabbet position on a corresponding striker plate.

12. The automatic hooking device with controlled releasing operation for blocks according to claim 1 wherein said hooking element freely rotates around said fulcrum point is substantially L shaped and includes a hooking profile shaped at the bottom side, a pushing portion, an insertion portion, said hooking profile by said rotation around said fulcrum point positioned from a release position in which said hooking profile is in an approximately horizontal condition to an engagement position in which said hooking profile is in an approximately vertical condition, the closing movement of said system of movable levers occurring by the pushing action of said engaging member or protrusions of said block which during the rising movement of said block due to the fact that the protrusions of said block lean on said pushing portion and apply a pushing action causing the rotation of said hooking element around said fulcrum point, said rotation of said hooking element ending in correspondence with said engagement position in which said engaging member or protrusions are internally inserted inside said insertion portion or concavity in a blocked condition by said tooth, the opening movement of said system of movable levers pushing said engaging member or protrusions of said block which during the lowering movement of said block due to the fact that they lean on a tooth apply said pushing causing the rotation of said hooking element around said fulcrum point, said rotation of said hooking element ending in correspondence with said release position in which said engaging member or protrusions are free to exit from said insertion portion or concavity.

13. The automatic hooking device with controlled releasing operation for blocks according to claim 12 wherein in correspondence with said release position of said hooking element in which said hooking profile is in an approximately horizontal condition, said pushing portion presents an inclination with respect to the horizontal direction, said inclination guiding said engaging member or protrusions towards said insertion portion during the rising action of said engaging member or protrusions.

14. The automatic hooking device with controlled releasing operation for blocks according to claim 1 further comprising a guide of said engaging member or protrusions, said guide member being a couple of reciprocally inclined guides converging toward an end groove for the insertion of said engaging member the inclined guides and an end groove constituting a guide shaped with an overturned Y shape in which reciprocally converging arms of said Y shape constitute said couple of inclined guides and a vertical arm of said Y shape constitutes said end groove, during the rising action of said block, said engaging member guided and centered until converging in said end groove.

15. The automatic hooking device with controlled releasing operation for blocks according to claim 1 further comprising two of said hooking/unhooking devices, each of said two hooking/unhooking devices located on an opposite side of said supporting structure.

16. The automatic hooking device with controlled releasing operation for blocks according to claim 15 wherein the movement of said two hooking/unhooking devices is synchronized by at least one connecting element connecting said two hooking/unhooking devices at least in one point.

17. The automatic hooking device with controlled releasing operation for blocks according to claim 16 wherein said connecting element connects said two hooking/unhooking devices in correspondence with said first pin.

18. The automatic hooking device with controlled releasing operation for blocks according to claim 1 wherein said engaging member is at least one protrusion in the form of a bar protruding with respect to said block.

19. The automatic hooking device with controlled releasing operation for blocks according to claim 18 wherein said engaging member is a couple of protrusions in the form of bars protruding from opposite sides of said block in correspondence of the pin of a third connecting pulley of a second cable or lifting/furling cable.

20. The automatic hooking device with controlled releasing operation for blocks according to claim 18 wherein said bar protrudes with respect to said block includes two side parts guiding said block and a central part hooked by said hooking/unhooking device.

21. The device of claim 1 further comprising block crane for life boats having at least one hooking/unhooking device.

22. The device of claim 1 further comprising a ship equipped with at least one crane comprising at least one hooking/unhooking device.

* * * * *